United States Patent
Inoue (10) Patent No.: US 9,812,726 B2
(45) Date of Patent: Nov. 7, 2017

(54) SOLID OXIDE FUEL CELL, FUEL CELL MODULE, AND FUEL CELL DEVICE

(71) Applicant: KYOCERA Corporation, Kyoto-shi, Kyoto (JP)

(72) Inventor: Shushin Inoue, Yokohama (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 163 days.

(21) Appl. No.: 14/374,935

(22) PCT Filed: Jan. 30, 2013

(86) PCT No.: PCT/JP2013/052053
§ 371 (c)(1),
(2) Date: Jul. 28, 2014

(87) PCT Pub. No.: WO2013/115255
PCT Pub. Date: Aug. 8, 2013

(65) Prior Publication Data
US 2014/0377683 A1   Dec. 25, 2014

(30) Foreign Application Priority Data

Jan. 30, 2012  (JP) .................................. 2012-016744

(51) Int. Cl.
*H01M 8/12*   (2016.01)
*H01M 8/1213*   (2016.01)
(Continued)

(52) U.S. Cl.
CPC ........... *H01M 8/12* (2013.01); *H01M 4/8657* (2013.01); *H01M 4/9033* (2013.01);
(Continued)

(58) Field of Classification Search
CPC .............................. H01M 8/12; H01M 8/1004
(Continued)

(56) References Cited

U.S. PATENT DOCUMENTS

| | | | | |
|---|---|---|---|---|
| 2008/0248395 A1* | 10/2008 | Harada | ................ | H01M 4/8657 429/304 |
| 2011/0177424 A1* | 7/2011 | Goto | ..................... | H01M 4/861 429/481 |
| 2012/0189939 A1* | 7/2012 | Fujimoto | ............ | H01M 8/0236 429/465 |

FOREIGN PATENT DOCUMENTS

| | | |
|---|---|---|
| EP | 2398103 A1 | 12/2011 |
| JP | 7254418 A | 10/1995 |

(Continued)

OTHER PUBLICATIONS

Yokoyama et al. JP 2008-222511. Sep. 25, 2008. English machine translation.*

(Continued)

*Primary Examiner* — James Lee
(74) *Attorney, Agent, or Firm* — Viering, Jentschura & Partner mbB (57) ABSTRACT

A solid oxide fuel cell includes a solid electrolyte layer, a fuel electrode layer that is disposed on one surface of the solid electrolyte layer, an oxygen electrode layer that is disposed on the other surface of the solid electrolyte layer, and an intermediate layer that is disposed between the solid electrolyte layer and the oxygen electrode layer and that includes ceria-based particles containing rare earth elements other than cerium and ceramic particles consisting of oxide of a metallic element different from that of the ceria-based particles. The ceramic particles having a smaller average particle diameter than that of the ceria-based particles exist in grain boundaries of the ceria-based particles of the intermediate layer.

8 Claims, 6 Drawing Sheets

(51) Int. Cl.
*H01M 8/1246* (2016.01)
*H01M 8/0297* (2016.01)
*H01M 8/124* (2016.01)
*H01M 8/1253* (2016.01)
*H01M 4/86* (2006.01)
*H01M 4/90* (2006.01)
*H01M 8/1004* (2016.01)
*H01M 8/2425* (2016.01)
*H01M 8/2475* (2016.01)

(52) U.S. Cl.
CPC ....... *H01M 8/0297* (2013.01); *H01M 8/1004* (2013.01); *H01M 8/124* (2013.01); *H01M 8/1213* (2013.01); *H01M 8/1246* (2013.01); *H01M 8/1253* (2013.01); *H01M 8/2425* (2013.01); *H01M 8/2475* (2013.01); *H01M 2008/1293* (2013.01); *Y02E 60/525* (2013.01); *Y02P 70/56* (2015.11)

(58) Field of Classification Search
USPC .......................................................... 429/482
See application file for complete search history.

(56) References Cited

FOREIGN PATENT DOCUMENTS

| | | | |
|---|---|---|---|
| JP | 2006278089 A | 10/2006 | |
| JP | 2008078126 A | 4/2008 | |
| JP | 2008222511 A | 9/2008 | |
| JP | 2008258064 A | 10/2008 | |
| JP | 2009099552 A | 5/2009 | |
| JP | 2010003478 A | 1/2010 | |
| JP | 2011238629 A | 11/2011 | |
| JP | 2011249186 A | 12/2011 | |
| WO | WO 2011/052692 | * 5/2011 | ............. H01M 8/02 |

OTHER PUBLICATIONS

International Search Report issued in the corresponding PCT application No. PCT/JP2013/052053, dated Mar. 19, 2013, 2 pages.

* cited by examiner

SOLID OXIDE FUEL CELL, FUEL CELL MODULE, AND FUEL CELL DEVICE

RELATED APPLICATIONS

The present application is a national stage entry according to 35 U.S.C. §371 of PCT application No.: PCT/JP2013/052053 filed on Jan. 30, 2013, which claims priority from Japanese application No.: 2012-016744 filed on Jan. 30, 2012, and is incorporated herein by reference in its entirety.

TECHNICAL FIELD

The present invention relates to a solid oxide fuel cell including a solid electrolyte layer, an oxygen electrode layer, and an intermediate layer therebetween, a fuel cell module, and fuel cell device.

BACKGROUND ART

Recently, various fuel cell modules housing a solid oxide fuel cell (hereinafter, simply referred to as a fuel cell) in a storing container are being suggested as an energy source for the next generation.

In the related art, a fuel cell that has a pair of flat surfaces parallel to each other, a fuel gas passage for circulating fuel gas inside, and also a conductive supporting body containing Ni is known. The fuel cell is configured by sequentially stacking a fuel electrode layer, a solid electrolyte layer, and an oxygen electrode layer on one flat surface of the conductive supporting body in this order, and stacking an interconnector on the other flat surface.

Additionally, an intermediate layer is formed between the solid electrolyte layer and the oxygen electrode layer for suppressing generation of reaction product between the solid electrolyte layer and the oxygen electrode layer (for example, see PTLs 1 and 2).

The intermediate layer of the fuel cell is configured with a dense first intermediate layer formed on the solid electrolyte layer side and a porous second intermediate layer formed on the oxygen electrode layer side.

CITATION LIST

Patent Literature

PTL 1: Japanese Unexamined Patent Application Publication No. 2008-78126
PTL 2: Japanese Unexamined Patent Application Publication No. 2010-3478

SUMMARY OF INVENTION

Technical Problem

Since the intermediate layer disclosed in PTLs 1 and 2 is configured with ceria ($CeO_2$)-based particles containing a rare earth element other than cerium, if an intermediate layer consisting of ceria ($CeO_2$)-based particles is formed on the solid electrolyte layer configured with, for example, zirconia ($ZrO_2$)-based particles, a firing shrinkage behavior of the solid electrolyte layer is different from that of the intermediate layer, so stress concentration is generated on the intermediate layer formed on the solid electrolyte layer. Therefore, it is concerned that the intermediate layer becomes separated from the solid electrolyte layer during the electric power generation.

An object of the present invention is to provide a solid oxide fuel cell that can decrease the separation of an intermediate layer, a fuel cell module, and a fuel cell device.

Solution to Problem

A solid oxide fuel cell according to the present invention includes a solid electrolyte layer; a fuel electrode layer that is disposed on one surface of the solid electrolyte layer; an oxygen electrode layer that is disposed on the other surface of the solid electrolyte layer; and an intermediate layer that is disposed between the solid electrolyte layer and the oxygen electrode layer and that includes ceria-based particles containing rare earth elements other than cerium, and ceramic particles consisting of oxide of a metallic element different from that of the ceria-based particles, in which the ceramic particles having a smaller average particle diameter than that of the ceria-based particles exist in grain boundaries of the ceria-based particles of the intermediate layer.

A fuel cell module according to the present invention is configured to house the solid oxide fuel cell in a storing container.

A fuel cell device according to the present invention is configured to house the fuel cell module and a unit for operating the fuel cell module in an exterior case.

Advantageous Effects of Invention

In a solid oxide fuel cell according to the present invention, it is possible to decrease the separation of the intermediate layer from the solid electrolyte layer, and in the fuel cell module and the fuel cell device housing the solid oxide fuel cell in the storing container, it is possible to enhance the long-term reliability.

BRIEF DESCRIPTION OF DRAWINGS

FIGS. 1A and 1B are diagram illustrating a planar fuel cell, of which

FIGS. 3A and 3B are diagram illustrating a hollow planar fuel cell, of which

FIGS. 4A and 4B are diagram illustrating an example of fuel cell stack device, of which

DESCRIPTION OF EMBODIMENTS

Figure 1A:
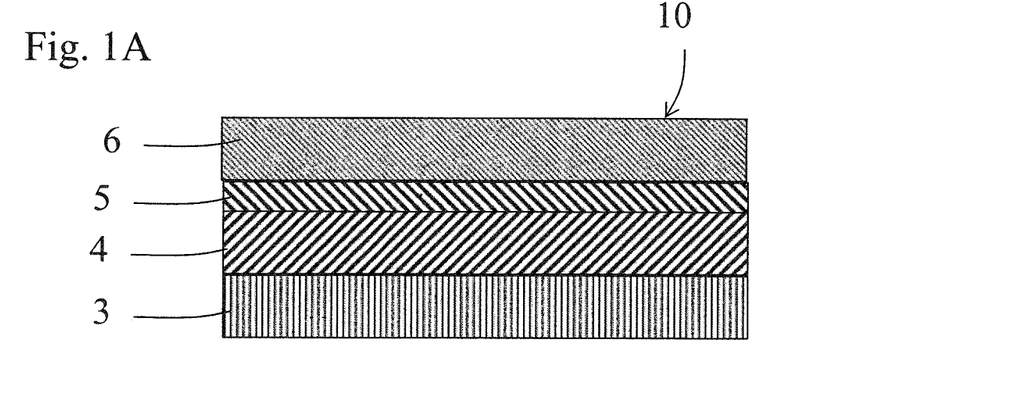
FIG. 1A is a traverse cross sectional view.
Figure 1B:
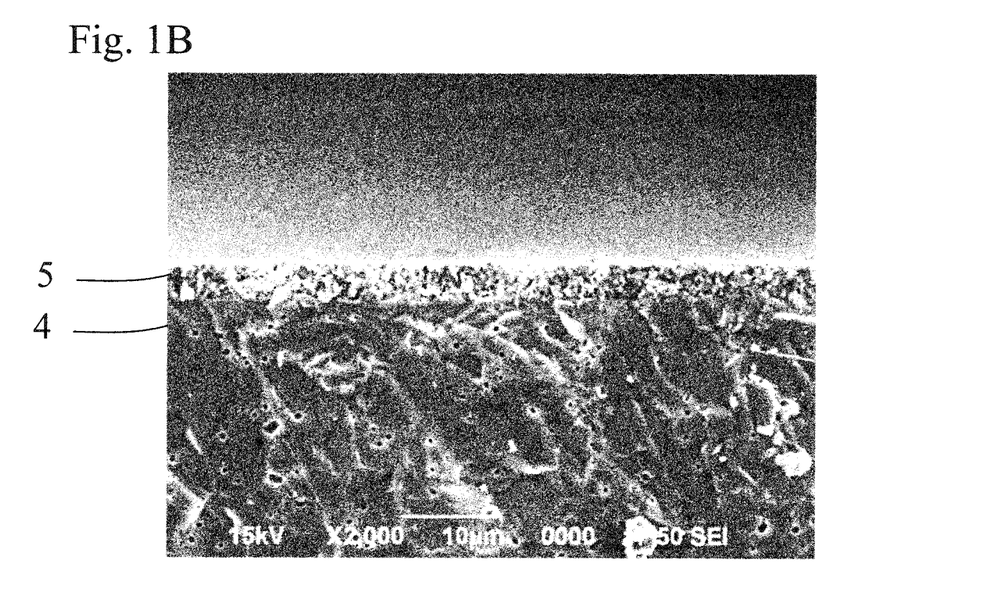
FIG. 1B is a scanning electron microscope (SEM) photograph of an intermediate layer on a solid electrolyte layer and the vicinity of the intermediate layer.

FIGS. 1A and 1B are diagram illustrating an example of a planar fuel cell according to the present embodiment. FIG. 1A is a longitudinal cross sectional view of the planar fuel cell, and FIG. 1B is a scanning electron microscope (SEM) photograph of an intermediate layer on a solid electrolyte layer and the vicinity of the intermediate layer.

A fuel cell 10 is configured by sequentially stacking a fuel electrode layer 3 on one side of a solid electrolyte layer 4, and an intermediate layer 5 and an oxygen electrode layer 6 on the other side of the solid electrolyte layer 4. The intermediate layer 5 between the solid electrolyte layer 4 and the oxygen electrode layer 6 strengthen the bonding between the solid electrolyte layer 4 and the oxygen electrode layer 6, and suppress the reaction between the component of the solid electrolyte layer 4 and the component of the oxygen electrode layer 6 which forms a reaction layer having high electrical resistance.

The fuel electrode layer 3 can cause the electrode reaction to occur, and is preferably formed by well-known porous conductive ceramics. For example, the fuel electrode layer 3 may be configured with $ZrO_2$ in which rare earth oxide is dissolved in solid or $CeO_2$ in which rare earth oxide is dissolved in solid, and Ni and/or NiO. Further, examples of the rare earth element include at least one element selected from the group consisting of Y, Lu, Yb, Tm, Er, Ho, Dy, Gd, Sm, and Pr. For example, the rare earth element can be configured with $ZrO_2$ (YSZ) in which $Y_2O_3$ is dissolved in solid and Ni and/or NiO.

In the fuel electrode layer 3, the content of $ZrO_2$ in which the rare earth oxide is dissolved in solid or $CeO_2$ in which the rare earth oxide that is dissolved in solid is preferably in the range from 35 volt to 65 vol %, and the content of Ni or NiO is preferably in the range from 65 vol % to 35 vol %. Moreover, the open porosity of the fuel electrode layer 3 is preferably 15% or more, and more preferably from 20% to 40%, and the thickness of the fuel electrode layer 3 is preferably in the range from 1 μm to 30 μm.

The solid electrolyte layer 4 preferably uses dense ceramics consisting of partially stabilized or stabilized $ZrO_2$ containing the rare earth element of 3 mol % to 15 mol % such as Y, Sc, and Yb. In addition, Y is preferable as the rare earth element in terms of lower costs. Moreover, the solid electrolyte layer 4 is preferably dense so that the relative density (according to the Archimedes method) is 93% or more, and particularly 95% or more, and the thickness is in the range from 5 μm to 50 μm, in terms of the prevention of gas permeation. The solid electrolyte layer 4 can use lanthanum gallate-based ceramics.

The oxygen electrode layer 6 is preferably configured with conductive ceramics consisting of a so-called perovskite-type oxide of an $ABO_3$ type. The perovskite-type oxide is preferably transition metal perovskite-type oxide, more preferably at least one of $LaMnO_3$-based oxide, $LaFeO_3$-based oxide, and $LaCoO_3$-based oxide in which Sr and La coexist in the A site, and $LaCoO_3$-based oxide is particularly preferable in terms of the high electrical conductivity in the operational temperature of about 600° C. to 1000° C. Further, in the perovskite-type oxide, Fe or Mn together with Co may exist in the B site.

In addition, the oxygen electrode layer 6 is required to have gas permeability, and thus the conductive ceramics (perovskite-type oxide) that forms the oxygen electrode layer 6 is to have the open porosity preferably of 20% or higher, and more preferably of 30% to 50%. Moreover, the thickness of the oxygen electrode layer 6 is preferably 30 μm to 100 μm in terms of the electric power collection property.

Figure 2A:
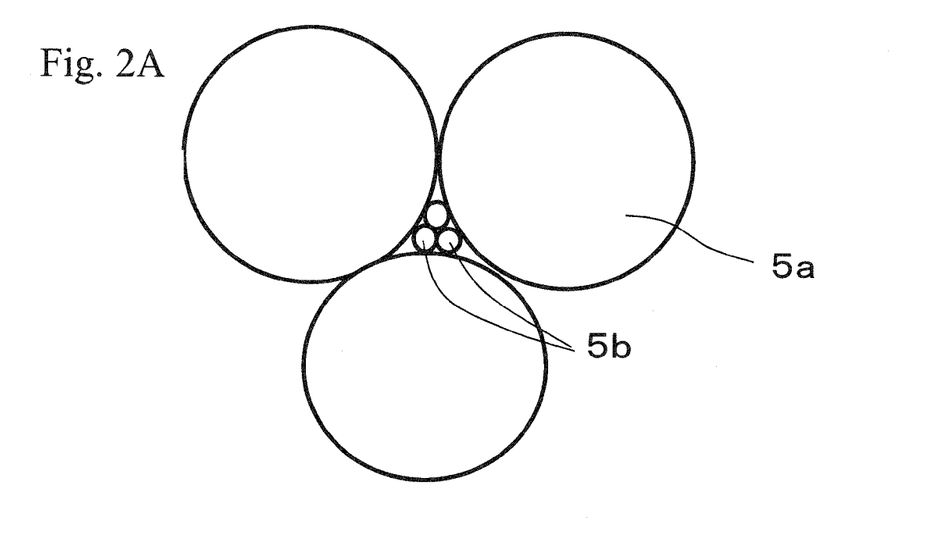
FIG. 2A are conceptual diagram illustrating a constitution of an intermediate layer.

Additionally, the intermediate layer 5 is configured with ceria ($CeO_2$)-based ceramics as schematically illustrated in FIG. 2A. The intermediate layer 5 contains ceria ($CeO_2$)-based particles 5a containing another rare earth element other than Ce, and ceramic particles 5b consisting of oxide of the metallic element different from that of the $CeO_2$-based particles 5a. The constitution of the intermediate layer 5 has a constitution in which the $CeO_2$-based particles 5a sinter each other when the ceramic particles 5b having smaller average particle diameter than that of the $CeO_2$-based particles 5a exist at the grain boundaries, especially the triple junction point, of the $CeO_2$-based particles 5a and has many pores. At the triple junction point of the $CeO_2$-based particles 5a, the plurality of ceramic particles 5b may exist. The porosity of the intermediate layer 5 is in the range from 20% to 40%. The average particle diameter of the $CeO_2$-based particles 5a is in the range from 1 μm to 3 μm, and the average particle diameter of the ceramic particles 5b is in the range from 0.1 μm to 0.5 μm. The average particle diameter can be obtained from an image analysis device by using a scanning electron microscope (SEM) photograph of the cross section of the intermediate layer.

The another rare earth element other than Ce includes at least one element selected from the group consisting of Y, Lu, Yb, Tm, Er, Ho, Dy, Gd, Sm, and Pr, and the $CeO_2$-based particles 5a containing the another rare earth element other than Ce is preferably to have a constitution represented by, for example, $(CeO_2)_{1-x}(REO_{1.5})_x$ (in the expression, RE is at least one of Sm, Y, Yb, and Gd, and x is a number satisfying $0<x\leq0.3$). Moreover, in terms of the decrease of the electric resistance, RE preferably uses Sm or Gd, and preferably consists of, for example, $CeO_2$ in which $SmO_{1.5}$ or $GdO_{1.5}$ of 15 mol % to 25 mol % is dissolved in solid.

As illustrated in FIG. 2A, with respect to the ceramic particles 5b, since one or the plurality of the ceramic particles 5b smaller than the $CeO_2$-based particles 5a exist at the triple junction point of the $CeO_2$-based particles 5a of the intermediate layer 5, the ceramic particles 5b can be oxide of the metallic element that suppresses the sintering of the $CeO_2$-based particles 5a. Accordingly, the intermediate layer 5 can have a constitution in which the ceramic particles 5b consisting of oxide of the metallic element suppressing the sintering of the $CeO_2$-based particles 5a are dispersed in the matrix consisting of the $CeO_2$-based particles 5a. As described above, the dispersed constitution refers to the constitution in which the ceramic particles 5b exist at the grain boundaries, for example, at the triple junction point of the $CeO_2$-based particles 5a that configure the matrix.

In order to suppress the sintering of the $CeO_2$-based particles 5a, the ceramic particles 5b are particles which do not substantially react with the $CeO_2$-based particles 5a, that is, which are not substantially dissolved in solid in the $CeO_2$-based particles 5a. For example, the $CeO_2$-based particles 5a illustrated in FIG. 2A are bonded to each other by sintering, and the $CeO_2$-based particles 5a and the ceramic particles 5b are not bonded to each other, or the ceramic particles 5b are not bonded to each other.

The ceramic particles 5b are preferably at least one of alumina, titania, yttria, and iron oxide. Specifically, in order to suppress the sintering of the $CeO_2$-based particles 5a, the sintering temperature of the ceramic particles 5b is preferably higher than the sintering temperature of the $CeO_2$-based particles 5a. The sintering temperatures of the $CeO_2$-based particles 5a and the ceramic particles 5b can be compared with the sintering temperature of the ceramics consisting of the $CeO_2$-based particles 5a and the sintering temperature of the ceramics consisting of the ceramic particles 5b.

The content of the ceramic particles 5b in the intermediate layer 5 is not particularly limited as long as the content is an amount that can cause the sintering behavior of the $CeO_2$-based particles 5a to come closer to the solid electrolyte layer 4. However, the content is preferably in the rage of 1 mass % to 30 mass % among the entire amount of the intermediate layer in terms of the enhancement of an electric power generation performance with respect to the oxygen ion conductivity. Specifically, the content is preferably in the rage from 1 mass % to 10 mass %, and more preferably from 1 mass % to 5 mass %.

Moreover, the thermal expansion coefficient of the solid electrolyte layer 4 configured with $ZrO_2$-based particles is in the range from $10.0 \times 10^{-6}/°C$ to $10.7 \times 10^{-6}/°C$, and the thermal expansion coefficient of the ceramics consisting of the $CeO_2$-based particles 5a is in the range from $11.6 \times 10^{-6}/°C$ to $12.5 \times 10^{-6}/°C$. Therefore, the ceramic particles 5b preferably consist of a material having a smaller thermal expansion coefficient than that of the $CeO_2$-based particles 5a in terms of the suppression of the separation of the intermediate layer 5 from the solid electrolyte layer 4 or the generation of cracks. According to this, the bonding strength of the solid electrolyte layer 4 can be further enhanced. The ceramic particles having the smaller thermal expansion coefficient than the $CeO_2$-based particles 5a may be alumina, titania, or yttria. The content of the ceramic particles 5b in the intermediate layer 5 can be determined by considering the thermal expansion coefficient of the intermediate layer 5. The thermal expansion coefficients of the $CeO_2$-based particles 5a and the ceramic particles 5b can be compared with the thermal expansion coefficient of the ceramics including the $CeO_2$-based particles 5a and the thermal expansion coefficient of the ceramics including the ceramic particles 5b.

The thickness of the intermediate layer 5 is preferably 0.5 μm or more, more preferably 1 μm or more, and particularly preferably 3 μm or more in terms of the suppression of the formation of the reaction layer having high electrical resistance by the reaction between the component of the solid electrolyte layer 4 and the component of the oxygen electrode layer 6. The thickness is preferably 10 μm or lower, and more preferably 5 μm or lower in terms of the enhancement of the bonding strength and the enhancement of the long-term reliability. The intermediate layer 5 preferably includes one or multiple layers, and the total thickness is preferably 3 μm or more.

The fuel cell described above can be manufactured by coating and firing intermediate layer paste on the solid electrolyte layer 4 consisting of a $ZrO_2$-based composition. The intermediate layer paste is manufactured by manufacturing powder obtained by attaching fine particles of ceramic powder to the $CeO_2$-based powder containing, for example, the another rare earth element other than Ce and mixing the resultant with organic binder and a solvent.

Examples of attaching the fine particles of ceramic powder to the $CeO_2$-based powder are a method of adding fine ceramic particles to the $CeO_2$-based powder, and performing mixing with a ball mill, or a method of coating organic metal salt in which metal configuring the ceramic powder is dissolved on the $CeO_2$-based powder, and drying the resultant.

It is possible to form the intermediate layer 5 on the solid electrolyte layer 4 by coating the intermediate layer paste on the solid electrolyte layer 4, drying the resultant, and performing heat treatment at a higher temperature than the temperature that causes the $CeO_2$-based powder to sinter and at the range of the temperature that causes the fine particles of ceramic powder not to sinter. Thereafter, the oxygen electrode layer 6 is formed on the intermediate layer 5 and the fuel cell 10 is manufactured. Further, the fuel electrode layer 3 can be manufactured together with the solid electrolyte layer 4, or can be manufactured after the intermediate layer 5 is formed. In addition, the fuel electrode layer 3 can be manufactured by firing a molding of the solid electrolyte layer and a molding of the intermediate layer at the same time.

Figure 2B:
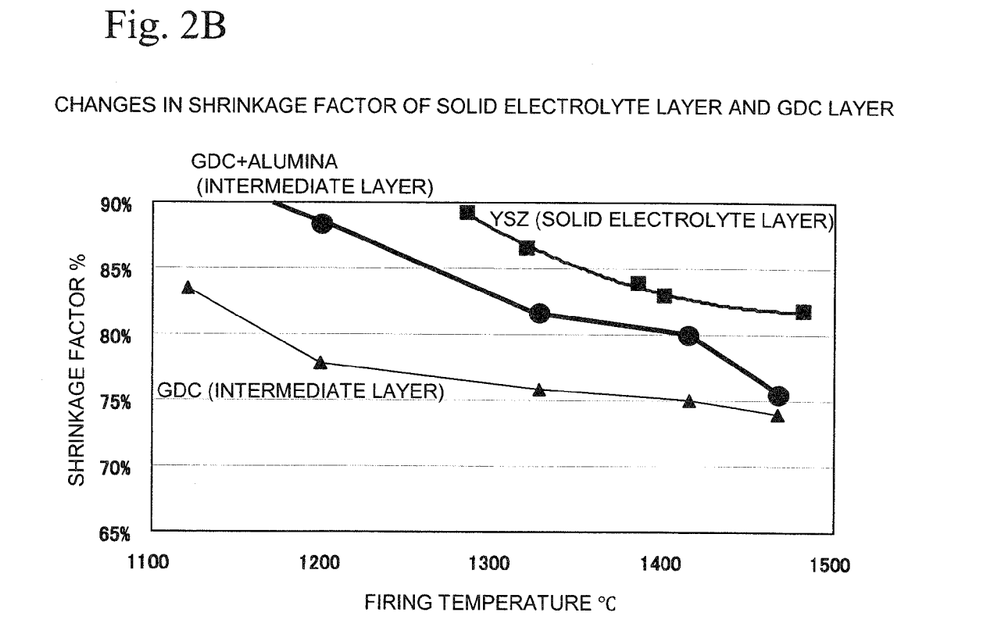
FIG. 2B is a graph illustrating a shrinkage factor with respect to a firing temperature.

In FIG. 2B, firing shrinkage behaviors of the solid electrolyte layer consisting of $ZrO_2$-based powder, intermediate layer (GDC+alumina) consisting of the $CeO_2$-based powder and the ceramic powder, and intermediate layer (GDC) consisting of $CeO_2$-based powder that does not contain ceramic particles are illustrated. The solid electrolyte layer consisting of the $ZrO_2$-based composition uses $ZrO_2$ containing Y of 8 mol % and having an average particle diameter of 0.8 μm. The intermediate layer consisting of the $CeO_2$-based powder and the ceramic powder uses a material consisting of alumina and $CeO_2$ (GDC) in which $GdO_{1.5}$ of 20 mol % is dissolved in solid. The intermediate layer consisting of the $CeO_2$-based powder that does not contain ceramic particles uses a material consisting of $CeO_2$ (GDC) in which $GdO_{1.5}$ of 20 mol % is dissolved in solid.

Since the intermediate layer consisting of the $CeO_2$-based powder not containing ceramic particles greatly shrinks from approximately 1100° C., while the solid electrolyte layer consisting of the $ZrO_2$-based composition shrinks from approximately 1300° C., the solid electrolyte layer starts to shrink after the shrinkage of the intermediate layer consisting of the $CeO_2$-based powder is almost finished. Therefore, it is concerned that great stress becomes generated in the intermediate layer, and cracks and separation are generated, and it is understood that, even if cracks and separation are not generated, the great stress concentration is generated in the intermediate layer 5. In contrast, since the intermediate layer consisting of the $CeO_2$-based powder and the ceramic powder has the shrinkage starting temperature close to that of the solid electrolyte layer and has firing shrinkage behavior close to that of the solid electrolyte layer, it is understood that the stress concentration is hardly generated in the intermediate layer.

Accordingly, in the present embodiment, the ceramic particles 5b suppress the $CeO_2$-based particles 5a from sintering, the firing shrinkage behavior of the intermediate layer 5 can come closer to the sintering behavior of the solid electrolyte layer 4, the stress concentration in the intermediate layer 5 on the solid electrolyte layer 4 can be decreased, and the generation of cracks in the intermediate layer 5 and the separation of the intermediate layer 5 from the solid electrolyte layer 4 can be decreased. Since the great stress concentration is not generated in the intermediate layer 5, the separation of the intermediate layer 5 from the solid electrolyte layer 4 and the generation of cracks in the intermediate layer 5 can be decreased when electric power is generated or the electric power generation is stopped. Accordingly, the bonding strength of the solid electrolyte layer 4 and the intermediate layer 5 can be increased and the intermediate layer 5 of one thick sheet can be formed on the solid electrolyte layer 4. In addition, if the intermediate layer 5 of one thick sheet is set to be a reaction preventing layer, the intermediate layer 5 is not the reaction preventing layer having a two-layered structure in the related art. Therefore, the structure is simple and the manufacturing method is easy.

Figure 3A:
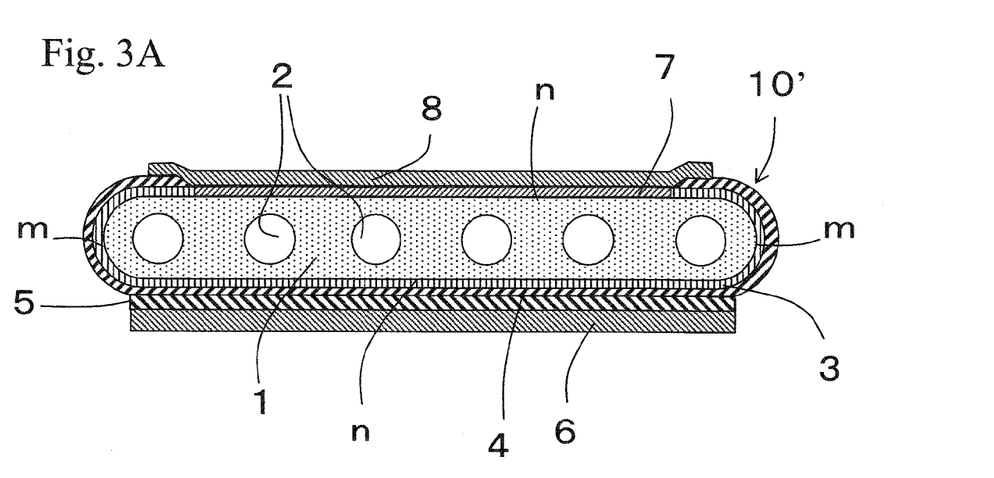
FIG. 3A is a transverse cross sectional view.
Figure 3B:
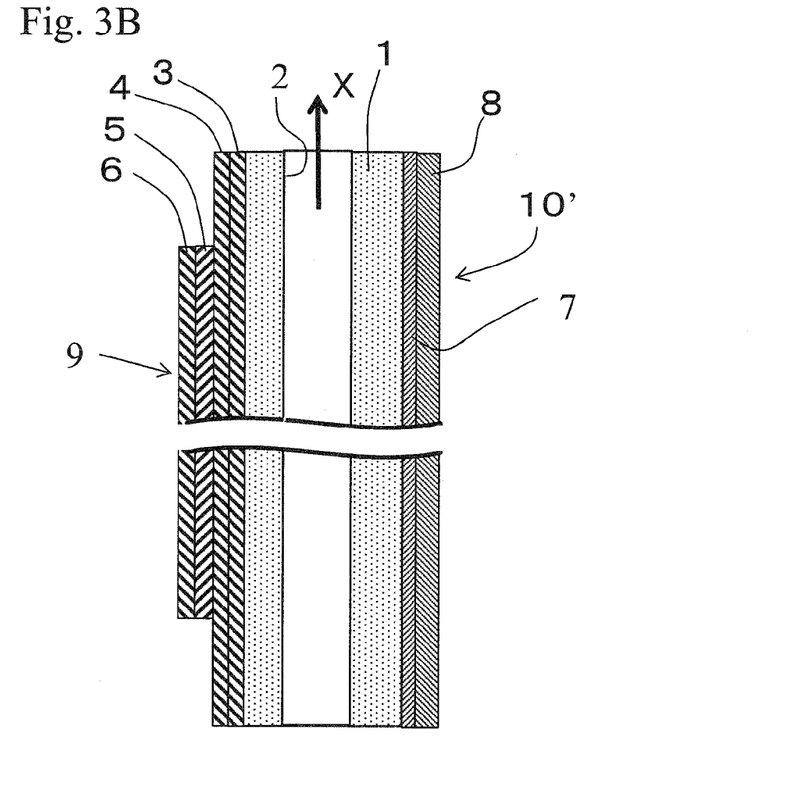
FIG. 3B is a longitudinal cross sectional view.

FIGS. 3A and 3B are diagram illustrating a hollow planar fuel cell. FIG. 3A is a transverse cross sectional view, and FIG. 3B is a longitudinal cross sectional view. Further, respective enlarged partial configurations of the fuel cell 10' are illustrated in FIGS. 3A and 3B.

The fuel cell 10' includes a porous conductive supporting body 1 that has a flat shape in the cross section and an elliptic cylinder shape as a whole, and that contains Ni. Inside the conductive supporting body 1, a plurality of fuel gas passages 2 are formed at an appropriate interval in the length direction (vertical direction to the paper surface in FIG. 3A), and the fuel cell 10' has a structure in which various members are provided on the conductive supporting body 1.

As understood from the shape illustrated in FIGS. 3A and 3B, the conductive supporting body 1 is configured with a pair of flat surfaces n which are parallel to each other and arc-shaped surfaces (side surfaces) m which are respectively bonded to the pair of flat surfaces n. Both surfaces of the flat surfaces n are formed almost parallel to each other, the porous fuel electrode layer 3 is provided so that one of the flat surfaces n (lower surface) and both sides of the arc-shaped surfaces m are covered, and also the dense solid electrolyte layer 4 is stacked so that the fuel electrode layer 3 is covered. In addition, the porous oxygen electrode layer 6 is stacked on the solid electrolyte layer 4 with the intermediate layer 5 interposed therebetween so as to face the fuel electrode layer 3. In addition, on the other flat surfaces n (upper surface) on which the fuel electrode layer 3 and the solid electrolyte layer 4 are not stacked, an interconnector 8 is formed with an adhesion layer 7 interposed therebetween.

That is, the fuel electrode layer 3 and the solid electrolyte layer 4 are formed to the other flat surface n (upper surface) through the arc-shaped surfaces m on both ends, both ends of the interconnector 8 consisting of a $LaCrO_3$-based sintered body are bonded to both ends of the solid electrolyte layer 4 consisting of $ZrO_2$-based particles, the conductive supporting body 1 is enclosed with the solid electrolyte layer 4 and the interconnector 8, and the configuration is performed so that fuel gas circulating inside is not leaked to the outside.

The fuel cell 10' generates electric power by causing a portion in which the fuel electrode layer 3 and the oxygen electrode layer 6 face each other through the solid electrolyte layer 4 to function as an electrode. That is, electric power is generated by causing gas containing oxygen such as atmospheric air to flow outside the oxygen electrode layer 6, causing fuel gas (gas containing hydrogen) to flow to the fuel gas passages 2 inside the conductive supporting body 1, and performing heating to a predetermined operational temperature. Additionally, current generated by the electric power generation is collected through the interconnector 8 provided in the conductive supporting body 1.

Hereinafter, members configuring the fuel cell 10' are each described below. Since the conductive supporting body 1 is required to have gas permeability for permeating fuel gas to the fuel electrode layer 3 and to have conductivity for performing electric power collection through the interconnector 8, the conductive supporting body 1 is preferably formed of, for example, Ni and/or NiO, and ceramic powder such as specific rare earth oxide.

The specific rare earth oxide is used in order to cause the thermal expansion coefficient of the conductive supporting body 1 to come closer to the thermal expansion coefficient of the solid electrolyte layer 4, and it is possible to use the rare earth oxide including at least one element selected from the group consisting of Y, Lu, Yb, Tm, Er, Ho, Dy, Gd, Sm, and Pr by being combined with Ni and/or NiO. It is possible to exemplify $Y_2O_3$, $Lu_2O_3$, $Yb_2O_3$, $Tm_2O_3$, $Er_2O_3$, $Ho_2O_3$, $DY_2O_3$, $Gd_2O_3$, $Sm_2O_3$, and $Pr_2O_3$ as specific examples of the rare earth oxide, $Y_2O_3$ and $Yb_2O_3$ are preferable in terms of the little solid solution and the little reaction with Ni and/or NiO, the thermal expansion coefficient is in the same level with the solid electrolyte layer 4, and lower costs.

In addition, according to the present embodiment, the rare earth oxide preferably exists in the volume ratio of Ni and/or NiO:rare earth oxide=35:65 to 65:35 in terms of the maintenance of satisfactory conductivity of the conductive supporting body 1 and the thermal expansion coefficient close to the solid electrolyte layer 4. Further, another metal component or another oxide component may be contained in the conductive supporting body 1 as long as the required characteristics are not damaged.

In addition, since the conductive supporting body 1 is required to have fuel gas permeability, the conductive supporting body 1 generally has the open porosity of 30% or more, and particularly preferably in the range of 35% to 50%. In addition, the conductivity of the conductive supporting body 1 is preferably 300 S/cm or more, and particularly preferably 440 S/cm or more.

Further, the length of the flat surface n of the conductive supporting body 1 (the length in the width direction of the conductive supporting body 1) is generally in the range from 15 mm to 35 mm, the length of the arc-shaped surface m (the length of the arc) is in the range from 2 mm to 8 mm, and the thickness of the conductive supporting body 1 (the thickness between the flat surfaces n) is preferably in the range from 1.5 mm to 5 mm. The length of the conductive supporting body 1 is in the range from 100 mm to 150 mm. The fuel electrode layer 3, the solid electrolyte layer 4, and the oxygen electrode layer 6 can use the aforementioned materials.

In addition, though the fuel electrode layer 3 extends to both sides of the adhesion layer 7 in the example of FIG. 3A, since the fuel electrode layer 3 is to be formed at a position facing the oxygen electrode layer 6, the fuel electrode layer 3 may be formed, for example, only on the flat surface n on the side on which the oxygen electrode layer 6 is provided. That is, the fuel electrode layer 3 is provided only on the flat surface n, and the solid electrolyte layer 4 is provided on the fuel electrode layer 3, both of the arc-shaped surfaces m of the conductive supporting body 1, and the other flat surface n on which the fuel electrode layer 3 is not formed.

In addition, the interconnector 8 is stacked on the flat surface n opposite to the oxygen electrode layer 6 of the conductive supporting body 1 with the adhesion layer 7 interposed therebetween.

The interconnector 8 is formed of conductive ceramics. Since the interconnector 8 is in contact with fuel gas (gas containing hydrogen) and gas containing oxygen, it is required to have reduction resistance and resistance to oxidation. Therefore, as conductive ceramics having the reduction resistance and the resistance to oxidation, lanthanum chromite-based perovskite oxide ($LaCrO_3$-based oxide) is generally used, and $LaCrMgO_3$-based oxide having Mg in the B site is particularly used in order to come closer to the thermal expansion coefficient of the conductive supporting body 1 and the solid electrolyte layer 4.

In addition, the thickness of the interconnector 8 is preferably in the range from 10 µm to 50 µm in terms of the prevention of gas from being leaked and the electric resistance. In this range, the leakage of the gas can be prevented and also the electrical resistance can be decreased.

Moreover, the adhesion layer 7 is formed between the conductive supporting body 1 and the interconnector 8 in order to reduce thermal expansion coefficient difference between the interconnector 8 and the conductive supporting body 1, or the like.

It is possible to form the adhesion layer 7 in the same composition as the fuel electrode layer 3. For example, the adhesion layer 7 may be formed of at least one of rare earth oxides, $ZrO_2$ in which rare earth oxide is dissolved in solid, and $CeO_2$ in which rare earth oxide is dissolved in solid, and Ni and/or NiO. More particularly, the adhesion layer 7 may be formed, for example, in the composition consisting of $Y_2O_3$ and Ni and/or NiO, the composition consisting of $ZrO_2$ (YSZ) in which $Y_2O_3$ is dissolved in solid, and Ni and/or NiO, and the composition consisting of $CeO_2$ in which oxide such as Y, Sm, and Gd is dissolved in solid, and Ni and/or NiO. Further, rare earth oxide or $ZrO_2$ ($CeO_2$) in which rare earth oxide is dissolved in solid, and Ni and/or NiO preferably have a volume ratio in the range of 40:60 to 60:40.

Additionally, the fuel cell 10' according to the present embodiment has the intermediate layer 5 in the same manner as the fuel cell 10 as illustrated in FIGS. 1A and 1B.

An example of a method of manufacturing the aforementioned fuel cell 10' is described. First, for example, a green body is prepared by mixing powder of Ni and/or NiO, powder of rare earth oxide such as $Y_2O_3$, an organic binder, and a solvent, a conductive supporting body molding is manufactured by extrusion molding using the green body, and the conductive supporting body molding is dried. Further, a calcined body obtained by calcining the conductive supporting body molding for 2 to 6 hours at 900° C. to 1000° C. may be used as the conductive supporting body molding.

Subsequently, for example, base materials of NiO and $ZrO_2$ (YSZ) in which $Y_2O_3$ is dissolved in solid are weighed and mixed according to the predetermined compound composition. Thereafter, slurry for the fuel electrode layer is prepared by mixing an organic binder and a solvent with the mixed powder.

Moreover, slurry produced by adding toluene, a binder, a commercially available dispersing agent, and the like to powder of $ZrO_2$ in which rare earth oxide is dissolved in solid, is formed into a thickness of 7 μm to 75 μm by a method such as a doctor blade method, so that a sheet-shaped solid electrolyte layer molding is manufactured. The fuel electrode layer molding is formed by coating the slurry for the fuel electrode layer on the obtained sheet-shaped solid electrolyte layer molding, and a surface on the fuel electrode layer molding side is stacked on the conductive supporting body molding. Further, the solid electrolyte layer molding may be stacked on the conductive supporting body molding (fuel electrode layer molding) by coating the slurry for the fuel electrode layer at a predetermined position of the conductive supporting body molding and drying the slurry.

Subsequently, the intermediate layer 5 is formed on the solid electrolyte layer 4. For example, the paste for the intermediate layer described above is manufactured and coated, and a film coating the intermediate layer is formed so that the molding is manufactured. Further, a sheet-shaped molding may be manufactured by using the paste for the intermediate layer, and the sheet-shaped molding may be stacked on the solid electrolyte layer molding.

Subsequently, a material for the interconnector (for example, $LaCrMgO_3$-based oxide powder), an organic binder, and a solvent are mixed, and slurry is prepared so that a sheet for the interconnector is manufactured.

Subsequently, adhesion layer molding positioned between the conductive supporting body 1 and the interconnector 8 is formed. For example, $ZrO_2$ in which $Y_2O_3$ is dissolved in solid and NiO are mixed so that the volume ratio is in the range of 40:60 to 60:40 and dried, slurry for the adhesion layer is adjusted by adding an organic binder or the like and coated on the conductive supporting body molding, the adhesion layer molding is formed, and the sheet for the interconnector is stacked on the adhesion layer molding.

Then, binder elimination is performed on the stacked molding, and simultaneous sintering (simultaneous firing) is performed in an oxygen-containing atmosphere such as the atmospheric air at 1400° C. to 1450° C. for 2 to 6 hours. According to this, the intermediate layer is formed on the surface of the solid electrolyte layer.

Moreover, slurry containing a material for the oxygen electrode layer (for example, $LaCoO_3$-based oxide powder), a solvent, and a pore forming material is coated on the intermediate layer 5 by dipping or the like, and fired at 1000° C. to 1300° C. for 2 to 6 hours so that the fuel cell 10' having the structure illustrated in FIGS. 3A and 3B can be prepared. Further, thereafter, with respect to the fuel cell 10', it is preferable to perform reduction treatment on the conductive supporting body 1 and the fuel electrode layer 3 by causing hydrogen gas to flow inside. At this point, it is preferable to perform the reduction treatment, for example, at 750° C. to 1000° C. for 5 to 20 hours.

Figure 4A:
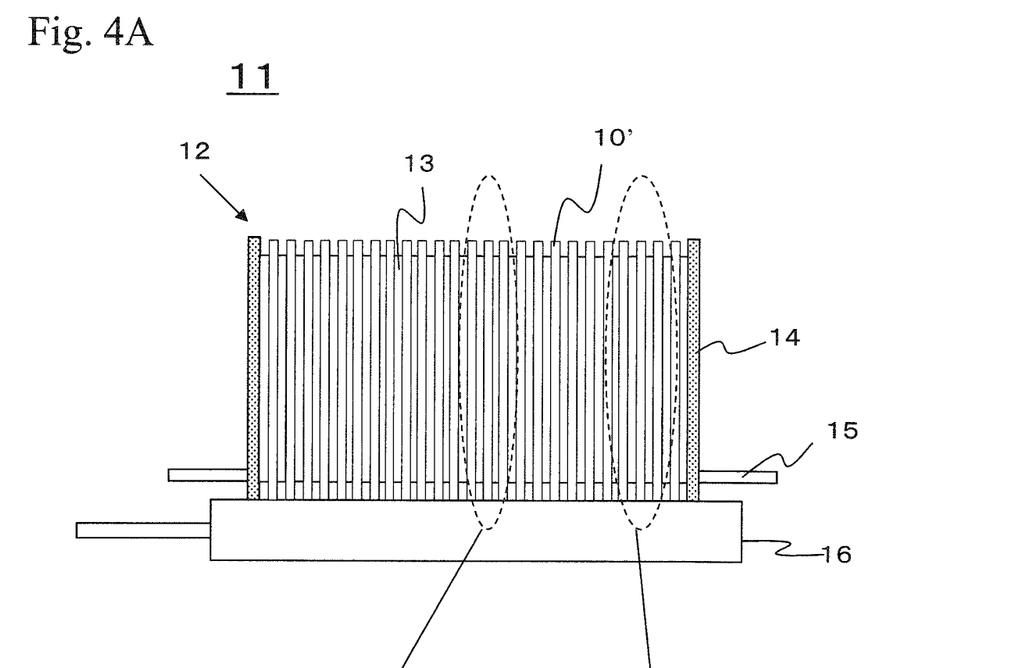
FIG. 4A illustrates a side view schematically illustrating the fuel cell stack device.
Figure 4B:
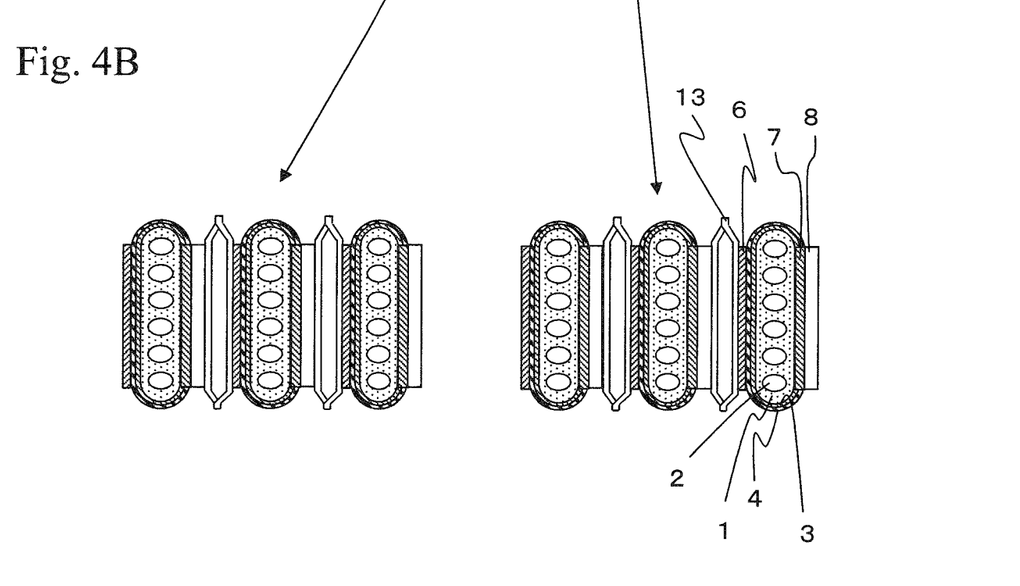
FIG. 4B is an enlarged cross sectional view illustrating portions of the fuel cell stack device of FIG. 4A enclosed by a broken line.

FIGS. 4A and 4B are diagram illustrating an example of a fuel cell stack device configured by electrically bonding the plurality of fuel cells 10' described above in series through power collecting members 13, of which FIG. 4A illustrates a side view schematically illustrating a fuel cell stack device 11, and FIG. 4B is an enlarged cross sectional view illustrating portions of the fuel cell stack device 11 of FIG. 4A, and extracts and illustrates the portions enclosed by a broken line illustrated in FIG. 4A. Further, in order to clarify the portions in FIG. 4B corresponding to the portions enclosed by the broken line illustrated in FIG. 4A, the portions are indicated by arrows. The fuel cell 10 illustrated in FIG. 4B is illustrated so that partial members such as the aforementioned intermediate layer 5 or the like are omitted.

Further, in the fuel cell stack device 11, a fuel cell stack 12 is configured by arranging the respective fuel cells 10' through the power collecting members 13, and lower ends of the respective fuel cells 10' are fixed to a gas tank 16 for supplying fuel gas to the fuel cells 10' by an adhesive agent such as a glass seal material or the like. In addition, the fuel cell stack device 11 includes elastically deformable conductive members 14 of which lower ends are fixed to the gas tank 16 so that the fuel cell stack 12 is interposed between both ends in the arrangement direction of the fuel cells 10'.

In addition, the conductive members 14 illustrated in FIGS. 4A and 4B includes a current drawing unit 15 that draws current generated by the electric power generation of the fuel cell stack 12 (the fuel cell 10') in the shape of extending to the outside along the arrangement direction of the fuel cells 10'.

Here, with respect to the fuel cell stack device 11 according to the present embodiment, the fuel cell stack 12 is configured by using the aforementioned fuel cells 10' so that the fuel cell stack device 11 with enhanced long-term reliability can be obtained.

Figure 5:
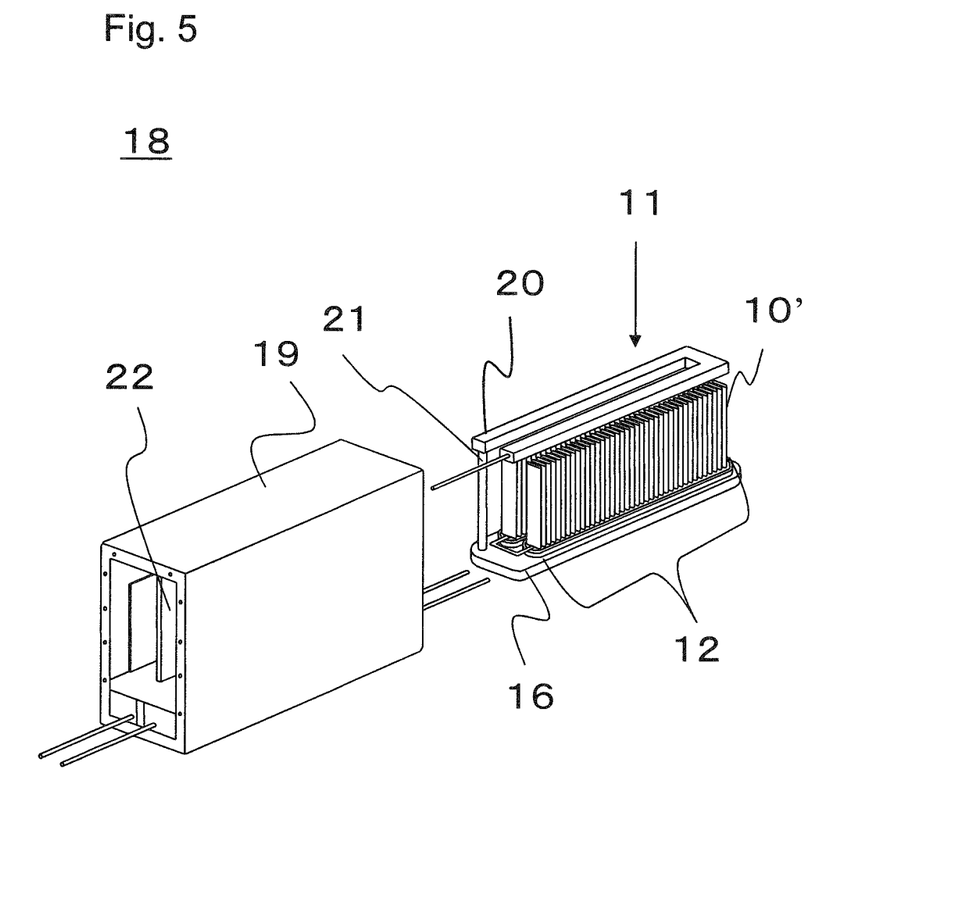
FIG. 5 is a perspective view illustrating an external appearance of an example of a fuel cell module.

FIG. 5 is a perspective view illustrating an external appearance of an example of a fuel cell module 18 configured to house the fuel cell stack device 11 in a storing container, and the fuel cell module 18 is configured to house the fuel cell stack device 11 illustrated in FIGS. 4A and 4B inside of a rectangular parallelepiped storing container 19.

Further, a reformer 20 for generating fuel gas by reforming raw material such as natural gas or kerosene in order to obtain fuel gas to be used in the fuel cell 10' is disposed on the upper portion of the fuel cell stack 12. Additionally, the fuel gas generated in the reformer 20 is supplied to the gas tank 16 through a gas circulating pipe 21, and supplied to the gas passages 2 provide inside the fuel cell 10' through the gas tank 16.

Further, FIG. 5 illustrates a state in which a portion (front and rear surfaces) of the storing container 19 is removed, and the fuel cell stack device 11 and the reformer 20 which are provided inside are drawn rearwards. In the fuel cell module 18 illustrated in FIG. 5, it is possible to slide and house the fuel cell stack device 11 in the storing container 19. Further, the fuel cell stack device 11 may include the reformer 20.

Further, an oxygen-containing gas introducing member 22 provided in the storing container 19 is arranged between the fuel cell stacks 12 arranged in parallel on the gas tank 16 as illustrated in FIG. 5, and also supplies oxygen-containing gas to the lower end portion of the fuel cell 10' so that the oxygen-containing gas flows through sides of the fuel cells 10' from the lower end portion to the upper end portion along the flow of the fuel gas. Additionally, the fuel gas discharged from the gas passages 2 of the fuel cell 10' is burnt on the upper end portion side of the fuel cell 10' so that the temperature of the fuel cell 10' can be increased, and the start of the fuel cell stack device 11 can be accelerated. In addition, the fuel gas discharged from the gas passages 2 of the fuel cell 10' is burnt on the upper end portion of the fuel cell 10' so that the reformer 20 provided above the fuel cell 10' (the fuel cell stack 12) can be heated. According to this, reforming reaction can be effectively performed by the reformer 20.

Moreover, with respect to the fuel cell module 18 according to the present embodiment, the fuel cell stack device 11 described above is housed in the storing container 19 so that the fuel cell module 18 with enhanced long-term reliability can be obtained.

Figure 6:
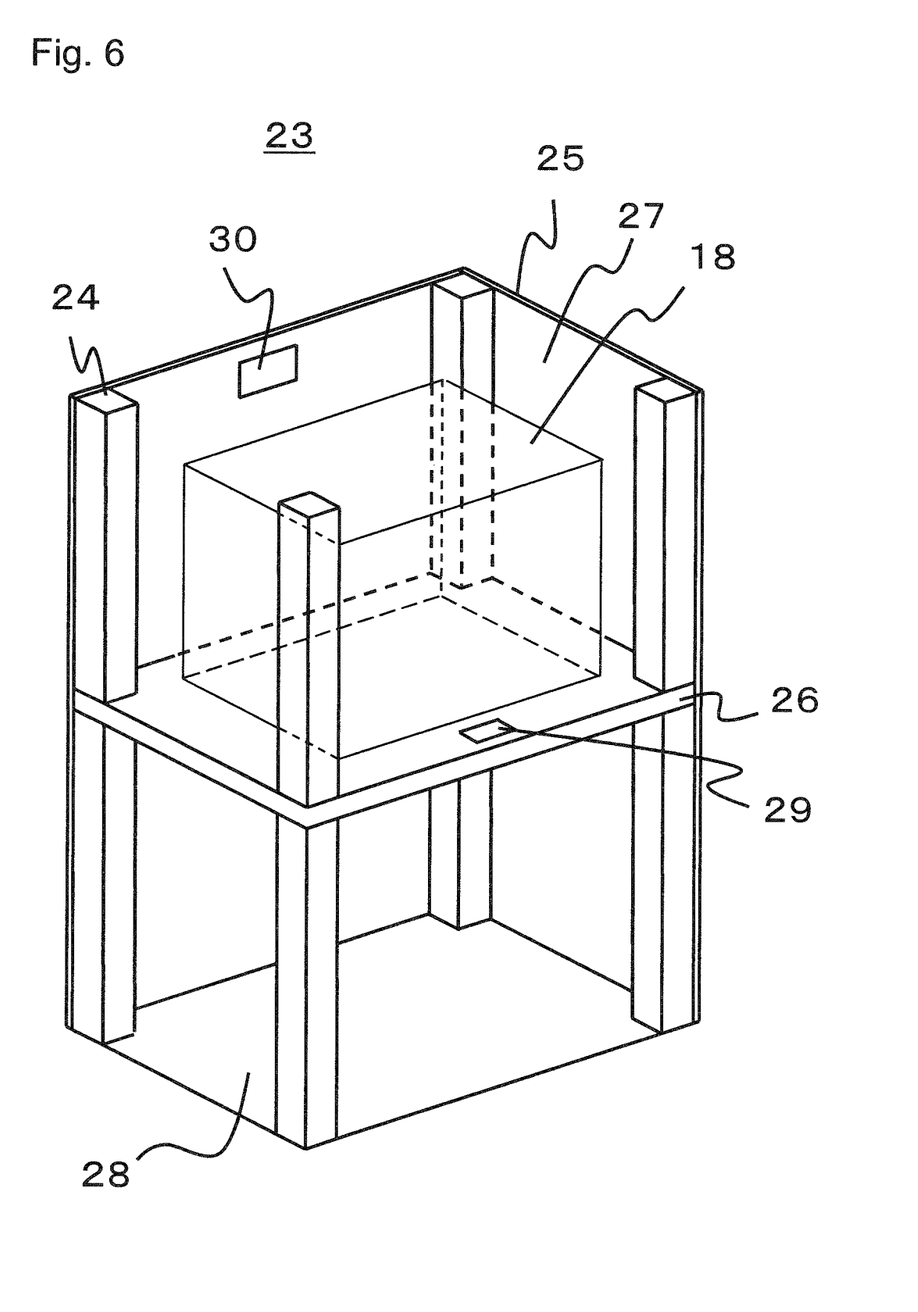
FIG. 6 is a perspective view illustrating the fuel cell device with a portion omitted.

FIG. 6 is an exploded perspective view illustrating an example of a fuel cell device that houses the fuel cell module 18 and a unit for operating the fuel cell stack device 11 illustrated in FIG. 5 in an exterior case. Further, in FIG. 6, configurations are partially omitted.

A fuel cell device 23 illustrated in FIG. 6 is configured by partitioning the exterior case configured with supporting columns 24 and outer boards 25 with a partition board 26 into upper and lower sides, setting the upper side to be the module receiving chamber 27 that houses the fuel cell module 18 described above, and setting the lower side to be a unit housing chamber 28 that houses a unit for operating the fuel cell module 18. Further, the unit and the like housed in the unit housing chamber 28 are omitted in the drawing.

In addition, an air circulation opening 29 that allows the air in the unit housing chamber 28 to flow to a module receiving chamber 27 side is provided in the partition board 26, and an exhaust port 30 to discharge the air in the module receiving chamber 27 is provided in a portion of the outer boards 25 that configures the module receiving chamber 27.

With respect to the aforementioned fuel cell device 23, as described above, the fuel cell device 23 in which reliability can be enhanced can be obtained by configuring the fuel cell module 18 with reliability enhanced to be housed in the module receiving chamber 27.

The present invention is not limited to the embodiments described above, and various changes and modifications are possible without departing from the gist of the present invention.

Further, in the embodiments above, a hollow flat solid electrolyte-type fuel cell is described, but it is obvious that the fuel cell may be a cylindrical solid electrolyte-type fuel cell.

In addition, in the embodiments above, one layer of the intermediate layer 5 is formed, but two layers of intermediate layers may be formed.

EMBODIMENT

A slurry obtained by mixing $ZrO_2$ powder (powder of a raw material of the solid electrolyte layer), having an average particle diameter of 0.8 μm according to a micro track method, in which $Y_2O_3$ of 8 mol % is dissolved in solid, an organic binder, and a solvent are used, and a sheet for the solid electrolyte layer is manufactured by a doctor blade method. The sheet for the solid electrolyte layer is subjected to a calcining treatment at 1000° C. for 3 hours, and a solid electrolyte layer-calcined body is obtained.

Subsequently, the paste for the intermediate layer manufactured by adding an acryl-based binder and a solvent to powder for the intermediate layer presented in Table 1 and performing mixing is coated on the solid electrolyte layer-calcined body by a screen printing method, an intermediate layer molding is manufactured and firing is performed in the atmospheric air at 1490° C. The thickness of the solid electrolyte layer is 30 μm, and the thickness of the intermediate layer is 3 μm in Samples Nos. 1 to 10, 5 μm in Sample No. 11, and 7 μm in Sample No. 12.

As the powder for the intermediate layer, powder obtained by mixing $CeO_2$ (GDC) powder having an average particle diameter of 0.8 μm in which $GdO_{1.5}$ of 20 mol % is dissolved in solid, $CeO_2$ (SDC) powder having an average particle diameter of 0.8 μm in which $SmO_{1.5}$ of 20 mol % is dissolved in solid, and ceramic powder of alumina, titania, yttria, and iron oxide, having an average particle diameter of 0.2 μm, with a ball mill for 12 to 24 hours.

Whether the intermediate layer is separated from the solid electrolyte layer after firing or the intermediate layer has cracks are checked by an SEM, and presented in Table 1. Further, in Samples Nos. 2 to 10, as illustrated in FIG. 2A, the constitution of the intermediate layer has ceramic particles having a smaller average particle diameter than that of the $CeO_2$-based particles at the grain boundaries of the $CeO_2$-based particles. The average particle diameter of the $CeO_2$-based particles is 1 μm or more, and the average particle diameter of the ceramic particles has almost the same particle diameter of the ceramic powder added as raw material powder. A shrinkage factor when firing Sample No. 2 is illustrated in FIG. 2B.

In addition, Samples Nos. 2 to 4 and 7 to 9 are heated to 750° C. by using an electric furnace, maintained for 3 hours, natural cooling to the room temperature is performed, the separation state of the intermediate layer from the solid electrolyte layer is checked with the SEM, and the result is illustrated in Table 1.

TABLE 1

| | Ceria-based powder | | | Ceramic powder | | | | Presence or Absence of Separation or cracks after firing | Presence or Absence of Separation or cracks after heat treatment |
|---|---|---|---|---|---|---|---|---|---|
| Sample No. | Composition | Average particle diameter (μm) | Added amount (Mass %) | Composition | Average particle diameter (μm) | Added amount (Mass %) | Thickness of Intermediate layer (μm) | | |
| 1 | GDC | 0.8 | 100 | — | — | — | 3 | Present | — |
| 2 | GDC | 0.8 | 95 | Alumina | 0.2 | 5 | 3 | Absent | Absent |
| 3 | GDC | 0.8 | 90 | Alumina | 0.2 | 10 | 3 | Absent | Absent |
| 4 | GDC | 0.8 | 95 | Titania | 0.3 | 5 | 3 | Absent | Absent |
| 5 | GDC | 0.8 | 95 | Yttria | 0.15 | 5 | 3 | Absent | — |
| 6 | GDC | 0.8 | 95 | Iron oxide | 0.3 | 5 | 3 | Absent | — |
| 7 | SDC | 0.8 | 95 | Alumina | 0.2 | 5 | 3 | Absent | Absent |
| 8 | SDC | 0.8 | 90 | Alumina | 0.2 | 10 | 3 | Absent | Absent |
| 9 | SDC | 0.8 | 95 | Titania | 0.3 | 5 | 3 | Absent | Absent |
| 10 | SDC | 0.8 | 95 | Yttria | 0.15 | 5 | 3 | Absent | — |
| 11 | GDC | 0.8 | 95 | Alumina | 0.2 | 5 | 5 | Absent | Absent |
| 12 | GDC | 0.8 | 95 | Alumina | 0.2 | 5 | 7 | Absent | Absent |

From Table 1, it is understood that in Sample No. 1 in which ceramic powder is not added, there are cracks or separation in the intermediate layer, but in Samples Nos. 2 to 10 in which alumina, titania, yttria, or iron oxide is added to the CeO$_2$ powder, the intermediate layer is not separated from the solid electrolyte layer, and cracks are not generated in the intermediate layer.

In addition, it is understood that even if heating is performed to 750° C. which is the electric power generating temperature (during electric power generation) and cooling to the room temperature is performed (stoppage of electric power generation), the intermediate layer is not separated from the solid electrolyte layer, or cracks are not generated in the intermediate layer in the sample of the present invention.

REFERENCE SIGNS LIST

1 CONDUCTIVE SUPPORTING BODY
2 FUEL GAS PASSAGE
3 FUEL ELECTRODE LAYER
4 SOLID ELECTROLYTE LAYER
5 INTERMEDIATE LAYER
5a CeO$_2$-BASED PARTICLES
5b CERAMIC PARTICLES
6 OXYGEN ELECTRODE LAYER
8 INTERCONNECTOR
11 FUEL CELL STACK DEVICE
18 FUEL CELL MODULE
23 FUEL CELL DEVICE

What is claimed is:

1. A solid oxide fuel cell, comprising:
a solid electrolyte layer;
a fuel electrode layer that is disposed on one surface of the solid electrolyte layer;
an oxygen electrode layer that is disposed on the other surface of the solid electrolyte layer; and
an intermediate layer that is disposed between the solid electrolyte layer and the oxygen electrode layer and that includes ceria-based particles containing rare earth elements other than cerium, and ceramic particles consisting of oxide of a metallic element different from that of the ceria-based particles, wherein the ceramic particles having a smaller average particle diameter than that of the ceria-based particles exist in grain boundaries of the ceria-based particles of the intermediate layer and wherein the ceramic particles consist of at least one of alumina, titania, and iron oxide,
wherein the intermediate layer has a porosity in a range from 20 percent to 40 percent.

2. The solid oxide fuel cell according to claim 1, wherein the intermediate layer includes one or multiple layers, and has a total thickness of 3 μm or higher.

3. The solid oxide fuel cell according to claim 1, wherein a thermal expansion coefficient of the ceramic particles is smaller than that of the ceria-based particles.

4. The solid oxide fuel cell according to claim 1, wherein a sintering temperature of the ceramic particles is higher than that of the ceria-based particles.

5. The solid oxide fuel cell according to claim 1, wherein the ceramic particles exist at a triple junction point of the ceria-based particles.

6. A fuel cell module configured to house the solid oxide fuel cell according to claim 1 in a storing container.

7. A fuel cell device configured to house the fuel cell module according to claim 6 and a unit for operating the fuel cell module in an exterior case.

8. The solid oxide fuel cell according to claim 1, wherein the content of the ceramic particles in the intermediate layer is in the range of 1 mass % to 30 mass % among the entire amount of the intermediate layer.

* * * * *